(12) United States Patent
Park et al.

(10) Patent No.: US 11,424,436 B2
(45) Date of Patent: Aug. 23, 2022

(54) POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Na Ri Park, Daejeon (KR); Sung Soon Park, Daejeon (KR)

(73) Assignee: LG Chem, Ltd. (KR)

( * ) Notice: Subject to any disclaimer, the term of this patent is extended or adjusted under 35 U.S.C. 154(b) by 268 days.

(21) Appl. No.: 16/617,273

(22) PCT Filed: Oct. 17, 2018

(86) PCT No.: PCT/KR2018/012300
§ 371 (c)(1),
(2) Date: Nov. 26, 2019

(87) PCT Pub. No.: WO2019/083221
PCT Pub. Date: May 2, 2019

(65) Prior Publication Data
US 2020/0350555 A1 Nov. 5, 2020

(30) Foreign Application Priority Data

Oct. 26, 2017 (KR) .................. 10-2017-0140217

(51) Int. Cl.
*H01M 4/04* (2006.01)
*H01M 4/505* (2010.01)
(Continued)

(52) U.S. Cl.
CPC ......... *H01M 4/0471* (2013.01); *H01M 4/505* (2013.01); *H01M 4/525* (2013.01); *H01M 10/0525* (2013.01); *H01M 2004/028* (2013.01)

(58) Field of Classification Search
CPC ....... H01M 10/0525; H01M 2004/028; H01M 4/0471; H01M 4/505; H01M 4/525
See application file for complete search history.

(56) References Cited

U.S. PATENT DOCUMENTS 10,256,466 B2 * 4/2019 Gunji .................... H01M 4/131
2002/0015887 A1 2/2002 Gao et al.
(Continued)

FOREIGN PATENT DOCUMENTS

CN 104078669 A 10/2014
CN 104733723 A 6/2015
(Continued)

OTHER PUBLICATIONS

International Search Report for Application No. PCT/KR2018/012300, dated Jan. 22, 2019.
(Continued)

*Primary Examiner* — Carlos Barcena
(74) *Attorney, Agent, or Firm* — Lerner, David, Littenberg, Krumholz & Mentlik, LLP (57) ABSTRACT

A method of preparing a positive electrode active material for a secondary battery includes preparing a precursor of a composite transition metal oxide compound represented by Formula 1, and mixing the precursor, a lithium source, and a doping element source and sintering the mixture to form a doped lithium composite transition metal oxide, wherein the doping element source is a hydroxide-based compound.

$$Ni_{1-(x1+y1)}Co_{x1}M^{a}_{y1}(OH)_2 \quad \text{[Formula 1]}$$

wherein, $M^a$ is at least one element selected from the group consisting of manganese (Mn) and aluminum (Al), and $0<x1\leq 0.4$, $0<y1\leq 0.4$, and $0<x1+y1\leq 0.4$. The positive electrode active material satisfies a weight loss
(Continued)

ratio at 600° C. of 1.0% or less and a weight loss ratio at 900° C. of 2.0% or less during thermogravimetric analysis (TGA).

8 Claims, 3 Drawing Sheets

(51) Int. Cl.
    *H01M 4/525*     (2010.01)
    *H01M 10/0525*     (2010.01)
    *H01M 4/02*     (2006.01)

(56) References Cited

U.S. PATENT DOCUMENTS

| | | |
|---|---|---|
| 2002/0018746 A1 | 2/2002 | Gao et al. |
| 2002/0150530 A1 | 10/2002 | Gao et al. |
| 2005/0266312 A1* | 12/2005 | Fujihara ............... H01M 4/525 |
| | | 429/231.1 |
| 2008/0280205 A1 | 11/2008 | Jiang et al. |
| 2009/0081548 A1 | 3/2009 | Nakura |
| 2012/0301390 A1 | 11/2012 | Kawakami et al. |
| 2014/0087262 A1 | 3/2014 | Imahashi et al. |
| 2014/0322609 A1 | 10/2014 | Choi et al. |
| 2016/0172671 A1* | 6/2016 | Yoo ...................... C01G 53/50 |
| | | 429/219 |
| 2017/0155146 A1 | 6/2017 | Lee et al. |
| 2017/0309910 A1 | 10/2017 | Jo et al. |
| 2018/0145319 A1 | 5/2018 | Kim et al. |

FOREIGN PATENT DOCUMENTS

| | | |
|---|---|---|
| CN | 105336941 A | 2/2016 |
| CN | 105789581 A | 7/2016 |
| JP | 2006351378 A | 12/2006 |
| JP | 2010527111 A | 8/2010 |
| JP | 2011023121 A | 2/2011 |
| KR | 20140081663 A | 7/2014 |
| KR | 20150042610 A | 4/2015 |
| KR | 20160040119 A | 4/2016 |
| KR | 20160083616 A | 7/2016 |
| KR | 20170063387 A | 6/2017 |
| KR | 20120109579 A | 7/2017 |
| WO | 2012141258 A1 | 10/2012 |
| WO | 2013081418 A1 | 6/2013 |

OTHER PUBLICATIONS

English translation of International Search Report for Application No. PCT/KR2018/012300, dated Jan. 22, 2019.

* cited by examiner

POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

CROSS-REFERENCE TO RELATED APPLICATIONS

The present application is a national stage entry under 35 U.S.C. § 371 of PCT/KR2018/012300 filed on Oct. 17, 2018, which claims priority to Korean Patent Application No. 10-2017-0140217, filed on Oct. 26, 2017, in the Korean Intellectual Property Office, the disclosures of which are incorporated herein in their entirety by reference.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium composite transition metal oxide' or 'NCA-based lithium composite transition metal oxide') in which a portion of nickel (Ni) is substituted with cobalt (Co) or manganese (Mn)/aluminum (Al), has been developed. However, since capacity characteristics of conventionally developed NCM-based/NCA-based lithium composite transition metal oxides are insufficient, the NCM-based/NCA-based lithium composite transition metal oxides have been limited in application.

In order to address such limitation, studies have recently been made to increase a nickel (Ni) content in the NCM-based/NCA-based lithium composite transition metal oxides. However, with respect to a high-Ni positive electrode active material having a high nickel content, since structural stability and chemical stability of the active material are low, there is a limitation in that thermal stability is rapidly reduced. Also, since residual amounts of lithium by-products present in the form of LiOH and $Li_2CO_3$ on the surface of the positive electrode active material are increased as the nickel content in the active material is increased, gas is generated and a swelling phenomenon occurs, and thus, lifetime and stability of the battery may also be reduced.

Thus, there is a need to develop a high-Ni positive electrode active material in which structural and thermal stabilities are excellent and residual amounts of lithium by-products are reduced while having high capacity.

DISCLOSURE OF THE INVENTION

Technical Problem

An aspect of the present invention provides a positive electrode active material for a secondary battery, in which, in a high-Ni NCM or NCA-based positive electrode active material containing nickel (Ni) in an amount of 60 mol % to secure high capacity, a lithium ion diffusion path is secured by improving diffusion of a doping element to allow the doping element to be uniformly doped inside the positive electrode active material, and structural stability and thermal stability are improved.

Technical Solution

According to an aspect of the present invention, there is provided a method of preparing a positive electrode active material for a secondary battery which includes preparing a precursor of a composite transition metal oxide compound represented by Formula 1; and mixing the precursor, a lithium source, and a doping element source and sintering the mixture to form a doped lithium composite transition metal oxide.

$$Ni_{1-(x1+y1)}Co_{x1}M^{\alpha}{}_{y1}(OH)_2 \qquad \text{[Formula 1]}$$

In Formula 1, $M^{\alpha}$ is at least one element selected from the group consisting of manganese (Mn) and aluminum (Al), and $0 < x1 \le 0.4$, $0 < y \le 0.4$, and $0 < x1 + y1 \le 0.4$.

According to another aspect of the present invention, there is provided a positive electrode active material for a secondary battery including a lithium composite transition metal oxide which includes nickel (Ni) and cobalt (Co) and includes at least one selected from the group consisting of manganese (Mn) and aluminum (Al), wherein an amount of nickel (Ni) among total transition metals in the lithium composite transition metal oxide is 60 mol % or more, the lithium composite transition metal oxide is doped with at least one doping element, and, during thermogravimetric analysis (TGA), a weight loss ratio at 600° C. and a weight loss ratio at 900° C. are 1.0% or less and 2.0% or less, respectively.

According to another aspect of the present invention, there is provided a positive electrode and a lithium secondary battery which include the positive electrode active material.

Advantageous Effects

According to the present invention, with respect to a high-Ni NCM or NCA-based positive electrode active material containing nickel (Ni) in an amount of 60 mol % or more, high capacity may be secured, a lithium ion diffusion path may be secured by improving diffusion of a doping element to allow the doping element to be uniformly doped inside the positive electrode active material, and structural stability and thermal stability may be improved.

Also, the high-Ni NCM or NCA-based positive electrode active material containing nickel (Ni) in an amount of 60 mol % or more is subjected to a washing process to remove residual lithium by-products, wherein, in the present invention, since a wider and deeper lithium ion diffusion path is secured during initial crystallization, recrystallization may be effectively performed when a surface of the positive electrode active material subjected to a severe physicochemical process, such as the washing process, is recrystallized and a portion of the residual lithium by-products, which have not been removed, may re-enter into the positive electrode active material to have an effect of further reducing the residual lithium by-products.

In a lithium secondary battery prepared by using the positive electrode active material for a secondary battery according to the present invention, initial capacity, efficiency, and high-temperature storage stability may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a positive electrode active material for a secondary battery of the present invention includes: preparing a precursor of a composite transition metal oxide compound represented by the following Formula 1; and mixing the precursor, a lithium source, and a doping element source and sintering the mixture to form a doped lithium composite transition metal oxide, wherein the doping element source is prepared by using a hydroxide-based compound.

[Formula 1]

In Formula 1, $M^a$ is at least one element selected from the group consisting of manganese (Mn) and aluminum (Al), and $0<x1\leq0.4$, $0<y\leq0.4$, and $0<x1+y1\leq0.4$.

In the present invention, since the hydroxide-based compound is used as the doping element source, a wider and deeper lithium ion diffusion path is secured by improving diffusion of a doping element to allow the doping element to be uniformly doped inside the positive electrode active material, and structural stability and thermal stability are improved.

Typically, an oxide-based compound has mainly been used as a doping element source, wherein the reason for this is that, with respect to the oxide-based compound, its dissociation temperature is within a sintering temperature range of the positive electrode active material to facilitate the use of cations. However, since a surface of the active material was only doped due to poor diffusion when the doping element source of the oxide-based compound was used, there was a limitation in that, with respect to a high-Ni NCM or NCA-based positive electrode active material containing nickel (Ni) in an amount of 60 mol % or more, structural stability and thermal stability were not secured due to the characteristics of the high-Ni NCM-based or NCA-based positive electrode active material having a high nickel content. Thus, in the present invention, when preparing the high-Ni NCM-based or NCA-based positive electrode active material containing nickel (Ni) in an amount of 60 mol % or more, since doping is performed using a hydroxide-based compound as a doping element source during primary sintering, diffusion is more improved than the case when the oxide-based compound is used, and thus, the doping element is uniformly doped inside the positive electrode active material and the structural stability and thermal stability are improved. Also, since a wider and deeper lithium ion diffusion path is secured during initial crystallization, the surface roughened by a washing process to remove residual lithium by-products is effectively recrystallized, and thus, it has been confirmed that surface structural stability is improved and an effect of further reducing the residual lithium by-products is obtained because a portion of the residual lithium by-products, which have not been removed, re-enters into the positive electrode active material.

The method of preparing a positive electrode active material for a lithium secondary battery of the present invention will be described in detail below for each step.

First, a precursor of a composite transition metal oxide compound represented by the following Formula 1 is prepared.

[Formula 1]

In Formula 1, $M^a$ is at least one element selected from the group consisting of manganese (Mn) and aluminum (Al), and $0<x1\leq0.4$, $0<y\leq0.4$, and $0<x1+y1\leq0.4$.

In the positive electrode active material precursor of Formula 1, Ni may be included in an amount corresponding to $1-(x1+y1)$, for example, $0.6\leq1-(x1+y1)<1$. If the amount of Ni in the positive electrode active material precursor of Formula 1 is 0.6 or more, since the amount of Ni, which is sufficient to contribute to charge and discharge, is secured, high capacity may be achieved. Preferably, Ni may be included in an amount satisfying $0.8\leq1-(x1+y1)\leq0.99$. As described above, with respect to the high-Ni-based positive electrode active material precursor in which nickel (Ni) is included in an amount of 60 mol % or more based on a total molar ratio of transition metals of the positive electrode active material precursor used in the present invention, since it is more difficult to secure the structural stability and the thermal stability, it is more important to improve the diffusion of the doping element and allow the doping element to be uniformly doped inside the active material.

In the positive electrode active material precursor of Formula 1, cobalt (Co) may be included in an amount corresponding to x1, that is, 0<x≤10.4. In a case in which the amount of Co in the positive electrode active material precursor of Formula 1 is greater than 0.4, there is a concern that cost may increase. The Co may specifically be included in an amount satisfying $0.05 \leq x1 \leq 0.2$, in consideration of a significant capacity characteristics improvement effect due to the inclusion of the Co.

In the positive electrode active material precursor of Formula 1, $M^a$ may be Mn or Al, or Mn and Al, and these metallic elements may improve stability of the active material, and, as a result, may improve stability of the battery. In consideration of a life characteristics improvement effect, the $M^a$ may be included in an amount corresponding to y1, that is, 0<y1≤0.4. If y1 in the positive electrode active material precursor of Formula 1 is greater than 0.4, there is a concern that output characteristics and capacity characteristics of the battery may be reduced, and the $M^a$ may specifically be included in an amount satisfying $0.05 \leq y1 \leq 0.2$.

Next, the precursor, a lithium source, and a doping element are mixed and sintered to form a doped lithium composite transition metal oxide. In this case, a hydroxide-based compound is used as the doping element source.

The doping element source may be at least one selected from the group consisting of $Zr(OH)_4$, $Mg(OH)_2$, $Al(OH)_3$, $Co(OH)_2$, $Ti(OH)_4$, and $Ba(OH)_2$, and $Zr(OH)_4$ may more preferably be used.

In the present invention, since doping may be performed using the hydroxide-based compound as the doping element source when the precursor and the lithium source are added and primary sintering is performed, the doping element may be allowed to be uniformly doped inside the positive electrode active material, a wider and deeper lithium ion diffusion path may be secured, and the structural stability and thermal stability of the high-Ni NCM-based or NCA-based positive electrode active material containing nickel (Ni) in an amount of 60 mol % or more may be improved.

Since the doping element source of the hydroxide-based compound has a lower activation energy required for diffusion than an oxide-based doping element source and is highly reactive even when it is exposed to the same heat source, it may have an excellent effect even if it is added in a smaller amount than when the oxide-based doping element source is used. Thus, the doping element source of the hydroxide-based compound may be added in an amount of 40 parts by mol to 60 parts by mol based on 100 parts by mol of a total amount of the oxide-based compound added when the oxide-based compound is added as the doping element source.

Thus, manufacturing cost may be reduced by reducing the amount of the doping element source added as described above, and density of a main metallic element in the positive electrode active material may be increased.

As the lithium source, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium raw material may include $Li_2CO_3$, $LiNO_3$, $LiNO_2$, $LiOH$, $LiOH\cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

An amount of the lithium source used may be determined according to amounts of the lithium and the metallic elements (Co, Mn/Al, etc.) excluding lithium in the finally prepared lithium composite transition metal oxide, and, specifically, the lithium source may be used in an amount such that a molar ratio of the lithium to the metallic elements excluding lithium (molar ratio of lithium/metallic elements) in the finally prepared lithium composite transition metal oxide is in a range of 0.98 to 1.1.

The sintering may be performed in a temperature range of 600° C. to 800° C., for example, 650° C. to 750° C. Specifically, the sintering may be performed for 5 hours to 30 hours in an oxidizing atmosphere such as air or oxygen.

The doped lithium composite transition metal oxide thus formed may be a high-Ni NCM-based or NCA-based positive electrode active material in which an amount of nickel (Ni) among total transition metals is 60 mol % or more.

After the high-Ni NCM-based or NCA-based positive electrode active material is formed as described above, a washing process is performed to remove residual lithium by-products, and secondary sintering may be performed.

As described above, with respect to the high-Ni NCM-based or NCA-based lithium composite transition metal oxide, since residual amounts of lithium by-products present in the form of LiOH and $Li_2CO_3$ on the surface of the positive electrode active material are increased, there is a limitation in that gas is generated and a swelling phenomenon occurs. Thus, a washing process for removing the residual lithium by-products may be performed. However, since lithium in a crystal structure as well as the residual lithium by-products is also removed by the washing process, crystallinity may be deteriorated and the surface structural stability may be reduced. Thus, a process of recrystallization of metallic elements on the surface of the active material may be further performed by performing the secondary sintering after the washing. A temperature of the secondary sintering may be in a range of 300° C. to 700° C., for example, 300° C. to 500° C.

In this case, since doping is performed using the doping element source of the hydroxide-based compound in the present invention to secure a wider and deeper lithium ion diffusion path during initial crystallization, the surface may be more effectively recrystallized to improve the surface structural stability when the surface is recrystallized by the secondary sintering, and the effect of further reducing the residual lithium by-products is also obtained because a portion of the residual lithium by-products, which have not been removed, re-enters into the positive electrode active material. That is, with respect to the positive electrode active material of the present invention prepared by using the doping element source of the hydroxide-based compound, since the wider and deeper lithium ion diffusion path than when the conventional oxide-based doping element source is used may be secured, it may be more favorable to the recrystallization of the surface roughened by the washing process and the reduction of the residual lithium by-products.

Next, a positive electrode active material for a secondary battery according to the present invention will be described.

The positive electrode active material for a secondary battery of the present invention prepared by the above-described method is a lithium composite transition metal oxide including nickel (Ni) and cobalt (Co) and including at least one selected from the group consisting of manganese (Mn) and aluminum (Al), wherein an amount of nickel (Ni) among total transition metals in the lithium composite transition metal oxide is 60 mol % or more, the lithium composite transition metal oxide is doped with at least one doping element, and, during thermogravimetric analysis (TGA), a weight loss ratio at 600° C. and a weight loss ratio at 900° C. are 1.0% or less and 2.0% or less, respectively.

In general, since structural stability and chemical stability of a high-Ni NCM-based or NCA-based lithium composite transition metal oxide, in which an amount of nickel (Ni) among transition metals is 60 mol % or more, are low, thermal stability is rapidly reduced, but structural stability and chemical stability of the high-Ni NCM-based or NCA-based lithium composite transition metal oxide of the present invention are significantly improved by using the doping element source of the hydroxide-based compound. Thus, the high-Ni NCM-based or NCA-based lithium composite transition metal oxide of the present invention may satisfy a weight loss ratio at 600° C. of 1.0% or less and a weight loss ratio at 900° C. of 2.0% or less during thermogravimetric analysis (TGA). Preferably, during thermogravimetric analysis (TGA), the weight loss ratio at 600° C. may be 0.8% or less and the weight loss ratio at 900° C. may be 1.8% or less.

The doping element may be at least one selected from the group consisting of zirconium (Zr), magnesium (Mg), aluminum (Al), cobalt (Co), titanium (Ti), and barium (Ba), and may more preferably be Zr. The doping element may be included in an amount of 1,000 ppm to 10,000 ppm, for example, 1,000 ppm to 5,000 ppm in the positive electrode active material.

Also, in the present invention, since the inside of the active material is uniformly doped with the doping element by using the doping element source of the hydroxide-based compound, a particle of the lithium composite transition metal oxide may contain 30 mol % or more of a total amount of the doping element in a core region corresponding to 50% of a radius from the center of the particle to the surface thereof which is located near the center. Preferably, 40 mol % to 60 mol % of the total amount of the doping element may be contained in the core region. Thus, since the inside of the positive electrode active material of the present invention is uniformly doped with the doping element, the structural stability may be improved, the wider and deeper lithium ion diffusion path may be secured, and initial capacity, efficiency, and high-temperature storage stability of a lithium secondary battery may be improved.

Specifically, the lithium composite transition metal oxide may be represented by Formula 2 below.

$$Li_p Ni_{1-(x2+y2+z2)} Co_{x2} M^a_{y2} M^b_{z2} M^c_{q2} O_2 \quad \text{[Formula 2]}$$

In Formula 2, $M^a$ is at least one element selected from the group consisting of Mn and Al, $M^b$ is at least one element selected from the group consisting of Zr, Mg, Al, Co, Ti, and Ba, $M^c$ is at least one element selected from the group consisting of Al, Zr, Ti, Mg, tantalum (Ta), niobium (Nb), molybdenum (Mo), tungsten (W), and chromium (Cr), and $0.9 \leq p \leq 1.5$, $0 < x2 \leq 0.4$, $0 < y2 \leq 0.4$, $0 \leq z2 \leq 0.1$, $0 \leq q2 \leq 0.1$, and $0 < x2+y2+z2 \leq 0.4$.

In the lithium composite transition metal oxide of Formula 2, lithium (Li) may be included in an amount corresponding to p, that is, $0.9 \leq p \leq 1.5$. When p is less than 0.9, capacity may be reduced, and, when p is greater than 1.5, since particles are sintered in a sintering process, the preparation of the positive electrode active material may be difficult. The Li, for example, may be included in an amount satisfying $1.0 \leq p \leq 1.15$, in consideration of a significant capacity characteristics improvement effect and ease of the preparation of the active material due to the control of the amount of the Li.

In addition, a preferable composition of Ni, Co, and $M^a$ in the positive electrode active material of Formula 2 may be the same as the range of the composition of the above-described positive electrode active material precursor.

However, the $M^b$ may be a doping element included in the crystal structure of the positive electrode active material, wherein the $M^b$ may be included in an amount corresponding to z2, that is, $0 \leq z2 \leq 0.1$. Accordingly, in the lithium composite transition metal oxide, Ni may be included in an amount corresponding to $1-(x2+y2+z2)$, for example, $0.6 \leq 1-(x2+y2+z2) < 1$. Also, the lithium composite transition metal oxide may be a high-Ni-based lithium composite transition metal oxide in which the amount of nickel (Ni) is mol % or more based on the total molar ratio of the transition metals of the positive electrode active material, and Ni may more preferably be included in an amount satisfying $0.8 \leq 1-(x2+y2+z2) \leq 0.99$ in order to achieve higher capacity.

Furthermore, metallic elements of the $M^c$ may not be included in the positive electrode active material, and a lithium composite transition metal oxide, in which the surface of the active material is doped with the $M^c$, may be prepared by a method of mixing and sintering a $M^c$ source together when the precursor and the lithium source are mixed and sintered, or a method of forming a lithium composite transition metal oxide and then separately adding and sintering the $M^c$ source.

In the high-Ni NCM-based or NCA-based lithium composite transition metal oxide of the present invention, the residual lithium by-products may be present in an amount of 1.0 wt % or less, for example, 0.6 wt % or less. With respect to the present invention, since the structural stability is improved by using the doping element source of the hydroxide-based compound, the generation of the residual lithium by-products itself may be reduced. Furthermore, since the residual lithium by-products generated may be removed by the washing process and a portion of the residual lithium by-products, which have not been removed, may also re-enter into the positive electrode active material, the residual lithium by-products may be finally included in an amount of 0.6 wt % or less.

Also, with respect to the high-Ni NCM-based or NCA-based lithium composite transition metal oxide of the present invention, since the wider and deeper lithium ion diffusion path may be secured during initial crystallization, the surface may be more effectively recrystallized when the surface is recrystallized by the secondary sintering, and thus, cation disorder of Ni cations of a lithium layer in the high-Ni NCM-based or NCA-based lithium composite transition metal oxide structure may satisfy 0.5% or less.

According to another embodiment of the present invention, provided are a positive electrode for a lithium secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x$ (0<x<2), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move.

Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

After a $Ni_{0.8}Co_{0.15}Al_{0.05}(OH)_2$ positive electrode active material precursor and a LiOH lithium source were added to a Henscher mixer (700 L) in a molar ratio of 1.01:1.00 and 0.0025 mol of $Zr(OH)_4$ was further added, mixing was performed at 300 rpm at the center for 20 minutes. Mixed powder was put in an alumina crucible with a size of 330 mm×330 mm and primarily sintered at 750° C. for 15 hours in an oxygen atmosphere to prepare a Zr-doped lithium composite transition metal oxide.

The Zr-doped lithium composite transition metal oxide prepared was added to 240 mL of pure water and stirred for 30 minutes to wash the lithium composite transition metal oxide and filtering was performed for 20 minutes. The filtered lithium composite transition metal oxide was dried at 130° C. in a vacuum oven and was then sieved. The lithium composite transition metal oxide washed was secondarily sintered at 400° C. for 5 hours in an oxygen atmosphere to prepare a positive electrode active material.

Example 2

A positive electrode active material was prepared in the same manner as in Example 1 except that 0.005 mol of $Zr(OH)_4$ was added.

Example 3

A positive electrode active material was prepared in the same manner as in Example 1 except that 0.0025 mol of $Mg(OH)_2$ was added instead of $Zr(OH)_4$.

Comparative Example 1

A positive electrode active material was prepared in the same manner as in Example 1 except that $Zr(OH)_4$ was not added.

Comparative Example 2

A positive electrode active material was prepared in the same manner as in Example 1 except that 0.0025 mol of $ZrO_2$ was added instead of $Zr(OH)_4$.

Comparative Example 3

A positive electrode active material was prepared in the same manner as in Example 1 except that 0.005 mol of $ZrO_2$ was added instead of $Zr(OH)_4$.

Comparative Example 4

A positive electrode active material was prepared in the same manner as in Example 3 except that 0.0025 mol of MgO was added instead of $Mg(OH)_2$.

Comparative Example 5

A positive electrode active material was prepared in the same manner as in Example 1 except that $Zr(OH)_4$ was not added during primary sintering, and 0.0025 mol of $Zr(OH)_4$ was added during secondary sintering.

Experimental Example 1: XRD Structure Analysis

X-ray diffraction analysis was performed on the positive electrode active materials prepared in Example 1 and Comparative Examples 1, 2, and 5 using a Bruker AXS D4 Endeavor X-ray diffractometer (XRD), and cation disorder of Ni cations of a lithium layer according to the analysis is presented in Tables 1 and 2.

TABLE 1

|  | Example 1 | Comparative Example 1 | Comparative Example 5 |
|---|---|---|---|
| C-axis [Å] | 14.20212 | 14.19828 | 14.19801 |

TABLE 2

|  | Example 1 | Comparative Example 1 | Comparative Example 2 |
|---|---|---|---|
| Cation disorder (%) | 0.27 | 1.79 | 0.7 |

Referring to Table 1, since Comparative Example 1, in which doping was not performed, and Comparative Example 5, in which $Zr(OH)_4$ was added during the secondary sintering, had almost same c-axis values, it may be confirmed that the active material was not structurally affected when the $Zr(OH)_4$ was added during the second sintering. In contrast, since a c-axis value of Example 1, in which $Zr(OH)_4$ was added during the primary sintering, was increased different from Comparative Example 1, it may be understood that it was structurally stable due to the diffusion of the doping element inside the active material and a wider and deeper lithium ion diffusion path was also secured. Also, with respect to Example 1, an amount of cation disorder was reduced in comparison to that of Comparative Examples 1 and 2. This shows that, with respect to Example 1, since the wider and deeper lithium ion diffusion path was secured during initial crystallization than in Comparative Examples 1 and 2, recrystallization between surface residual lithium and metal ions after the secondary sintering was more effectively achieved.

Experimental Example 2: EPMA Analysis

An atomic ratio of metal in each of the positive electrode active materials prepared in Example 1 and Comparative Example 2 was measured using an electron probe micro analyzer (EPMA) while moving from the center of the positive electrode active material to the surface thereof. Line analysis was performed at an accelerating voltage of 15 keV with a beam current of 20 nA and a beam size of 1 μm. The results thereof are presented in FIG. 1 (Example 1) and FIG. 2 (Comparative Example 2).

Figure 1:
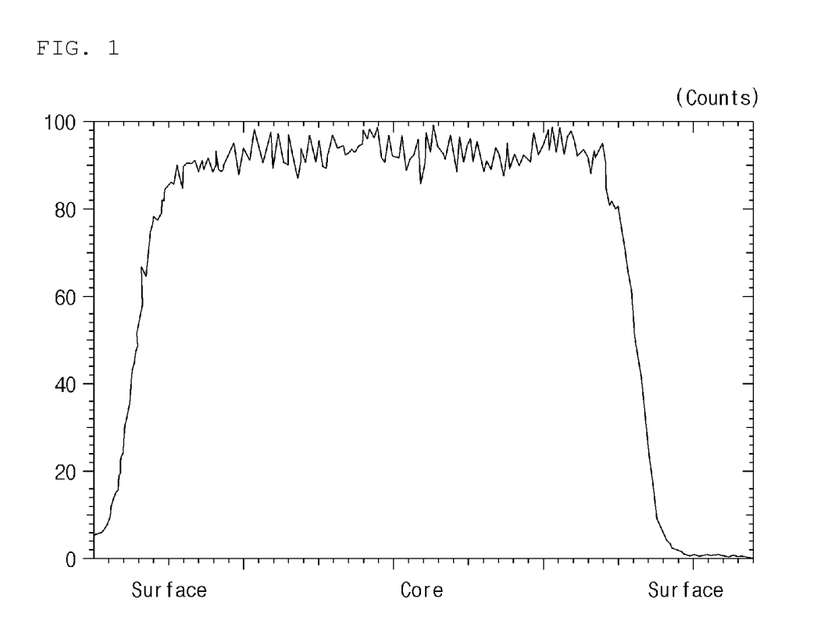
FIGS. 1 and 2 illustrate the results of electron probe microanalysis (EPMA) of positive electrode active materials prepared according to Example 1 (FIG. 1) and Comparative Example 2 (FIG. 2)

Referring to FIG. 1 (Example 1), with respect to the positive electrode active material of Example 1 using the hydroxide-based compound as the doping element source, it may be understood that the inside of the active material particle has a higher distribution of the doping element Zr than the surface of the active material particle, and it may be confirmed that 50 mol % or more of a total amount of the doping element was contained in a core region corresponding to 50% of a radius from the center of the particle to the surface thereof which was located near the center.

Figure 2:
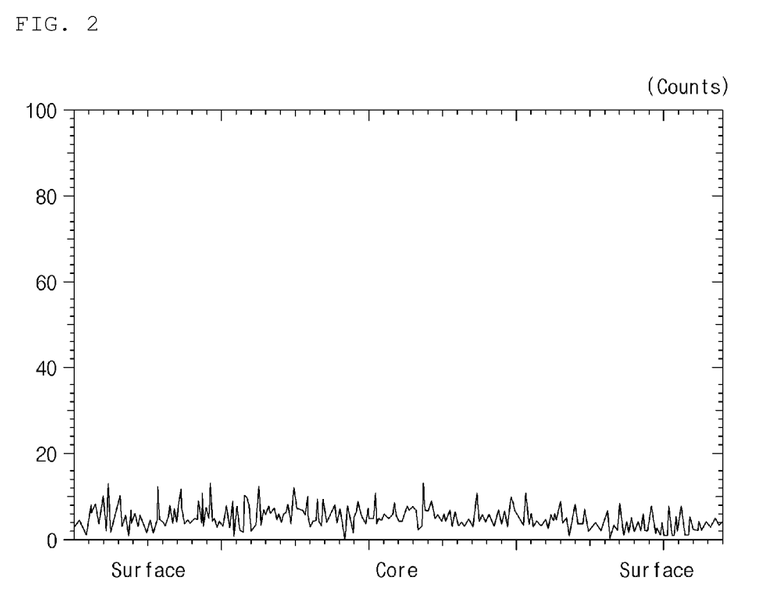

In contrast, referring to FIG. 2 (Comparative Example 2), with respect to the positive electrode active material of Comparative Example 2 using the oxide-based compound as the doping element source, the doping element Zr did not diffuse into the inside of the active material particle and the doping amount was also not large on the surface of the particle.

Experimental Example 3: Thermogravimetric Analysis (TGA)

Thermogravimetric analysis (TGA) was performed on the positive electrode active materials prepared in Example 1, Comparative Example 2, and Comparative Example 3 using a TGA7 thermogravimetric analyzer manufactured by Perkin-Elmer Inc. (USA) at a heating rate of 20° C./min under an ambient air flow of 50 ml/min, and the results thereof are presented in Table 3 and FIG. 3.

TABLE 3

|  | Example 1 | Comparative Example 2 Weight loss (%) | Comparative Example 3 |
|---|---|---|---|
| 400° C. | 0.527 | 0.953 | 0.818 |
| 500° C. | 0.567 | 1.055 | 0.915 |
| 600° C. | 0.625 | 1.180 | 1.036 |
| 700° C. | 0.791 | 1.408 | 1.259 |
| 800° C. | 1.023 | 1.722 | 1.558 |
| 900° C. | 1.769 | 2.454 | 2.359 |

Figure 3:
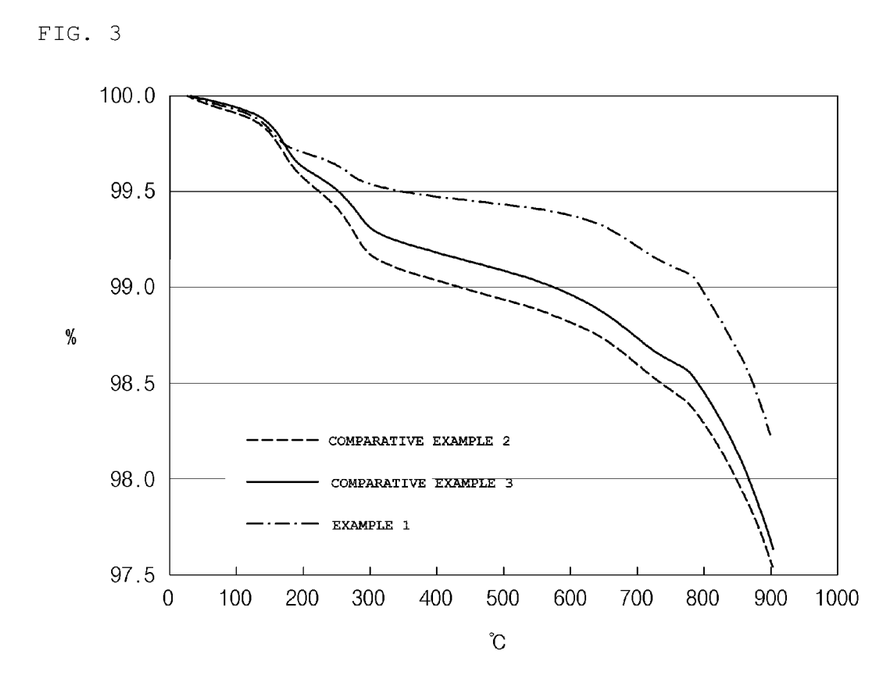
FIG. 3 is a graph illustrating the results of thermogravimetric analysis (TGA) of positive electrode active materials prepared according to Example 1 and Comparative Examples 2 and 3.

Referring to Table 3 and FIG. 3, with respect to the positive electrode active material of Example 1 using the hydroxide-based compound as the doping element source, a weight loss at 600° C. was 1.0% or less, and a weight loss at 900° C. satisfied 2.0% or less. The reason for this is that, with respect to Example 1, structural stability was improved and thermal stability was improved because the inside of the active material was uniformly doped with the doping element Zr.

In contrast, with respect to Comparative Examples 2 and 3 using the oxide-based compound as the doping element source, the weight loss at 600° C. was greater than 1.0%, and the weight loss at 900° C. was greater than 2.0%. With respect to Comparative Example 3, thermal stability was reduced even if the amount of the doping element was two times that of Example 1.

Experimental Example 4: Residual Lithium by-Products Evaluation

After 10 g of each of the positive electrode active materials prepared in Examples 1 to 3 and Comparative Examples 1 to 5 was dispersed in 100 mL of water, a change in pH was measured while the solution was titrated with 0.1 M HCl to obtain a pH titration curve. A residual amount of LiOH and a residual amount of $Li_2CO_3$ in each positive electrode active material were calculated by using the pH titration curve, and a sum of these values was evaluated as a total residual amount of the lithium by-product and is listed in Table 4 below.

TABLE 4

|  | LiOH residual amount (wt %) | $Li_2CO_3$ residual amount (wt %) | Total lithium by-products residual amount (wt %) |
|---|---|---|---|
| Example 1 | 0.270 | 0.197 | 0.467 |
| Example 2 | 0.300 | 0.181 | 0.482 |
| Example 3 | 0.340 | 0.237 | 0.580 |
| Comparative Example 1 | 0.520 | 0.592 | 1.114 |
| Comparative Example 2 | 0.410 | 0.340 | 0.754 |
| Comparative Example 3 | 0.360 | 0.299 | 0.663 |
| Comparative Example 4 | 0.440 | 0.438 | 0.875 |
| Comparative Example 5 | 0.490 | 0.523 | 1.012 |

Referring to Table 4, with respect to the positive electrode active materials of Examples 1 to 3 using the hydroxide-based compound as the doping element source, amounts of the residual lithium by-products were reduced in comparison to those of the comparative examples in which doping was not performed, the oxide-based compound was used as the doping element source, or the doping source was added during the secondary sintering.

Experimental Example 5: Battery Characteristics Evaluation

Each of the positive electrode active materials prepared in Examples 1 to 3 and Comparative Examples 1 to 5, a carbon black conductive agent, and a PVdF binder were mixed in an N-methylpyrrolidone solvent at a weight ratio of 95:2.5:2.5 to prepare a positive electrode material mixture (viscosity: 5,000 mPa·s), and one surface of an aluminum current collector was coated with the positive electrode material mixture, dried at 130° C., and then rolled to prepared a positive electrode.

Also, natural graphite as a negative electrode active material, a carbon black conductive agent, and a PVdF binder were mixed in an N-methylpyrrolidone solvent at a weight ratio of 85:10:5 to prepare a composition for forming a negative electrode active material layer, and one surface of a copper current collector was coated with the composition to prepare a negative electrode.

Each lithium secondary battery was prepared by preparing an electrode assembly by disposing a porous polyethylene separator between the positive electrode and the negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Charge/discharge tests were performed on each of the lithium secondary battery cells (full cells) prepared as described above to measure initial capacity and initial efficiency, and the results thereof are presented in Table 5 below.

Also, each of the lithium secondary battery cells (full cells) prepared as described above was charged and stored for 2 weeks in an oven at 60° C., cell resistance was measured during the storage, residual discharge capacity ratio (Ret) and recovery charge/discharge ratio (Rec) relative to before the high-temperature storage were confirmed by performing a discharge-charge-discharge cycle after the high-temperature storage, and measurement results are presented in Table 6.

TABLE 5

|  | Charge capacity (mAh/g) (@0.2 C) | Discharge capacity (mAh/g) (@0.2 C) | Efficiency (%) (@0.2 C) |
|---|---|---|---|
| Example 1 | 234.6 | 214.5 | 91.4 |
| Example 2 | 234.7 | 215.8 | 92.0 |
| Example 3 | 230.9 | 209.8 | 90.9 |
| Comparative Example 1 | 233.8 | 207.8 | 88.8 |
| Comparative Example 2 | 233.4 | 209.8 | 89.9 |
| Comparative Example 3 | 233.7 | 212.7 | 91.0 |

TABLE 5-continued

|  | Charge capacity (mAh/g) (@0.2 C) | Discharge capacity (mAh/g) (@0.2 C) | Efficiency (%) (@0.2 C) |
|---|---|---|---|
| Comparative Example 4 | 230.4 | 204.7 | 88.9 |
| Comparative Example 5 | 232.6 | 204.1 | 87.7 |

Referring to Table 5, with respect to the examples using the hydroxide-based compound as the doping element source, initial capacities and efficiencies were improved in comparison to those of the comparative examples.

With respect to Example 1 in which 0.0025 mol of $Zr(OH)_4$ was added as the doping element source, the initial capacity and efficiency were more improved than those of Comparative Example 3, in which 0.005 mol of $ZrO_2$ was added, even if the amount of the doping element source added was reduced to ½.

TABLE 6

|  | Resistance (IR) before high-temperature storage (Ω) | Resistance (IR) after high-temperature storage (Ω) | Ret (%) | Rec (%) |
|---|---|---|---|---|
| Example 1 | 2.10 | 3.45 | 89 | 96 |
| Example 3 | 2.74 | 4.90 | 90 | 97 |
| Comparative Example 2 | 2.29 | 3.73 | 85 | 92 |
| Comparative Example 4 | 2.90 | 5.56 | 86 | 93 |

Referring to Table 6, with respect to the examples using the hydroxide-based compound as the doping element source, resistance values after high-temperature storage were reduced in comparison to those of the comparative examples using the oxide-based compound. Also, residual discharge capacity and recovery charge and discharge after high-temperature storage were increased.

The invention claimed is:

1. A positive electrode active material for a secondary battery, comprising a lithium composite transition metal oxide which includes nickel (Ni), cobalt (Co), at least one doping element, and at least one selected from the group consisting of manganese (Mn) and aluminum (Al), wherein an amount of nickel (Ni) among total transition metals in the lithium composite transition metal oxide is 60 mol % or more, wherein the at least one doping element comprises zirconium (Zr), magnesium (Mg), titanium (Ti), or barium (Ba), tantalum (Ta), niobium (Nb), molybdenum (Mo), tungsten (W), and chromium (Cr), wherein 30 mol % or more of a total amount of the at least one doping element is contained in a core region corresponding to 50% of a radius from a center of a particle of the lithium composite transition metal oxide to a surface thereof which is located near the center, and wherein the positive active material has a weight loss ratio at 600° C. and a weight loss ratio at 900° C. of 1.0% or less and 2.0% or less, respectively, when measured by thermogravimetric analysis (TGA) at a heating rate of 20° C. per minute under ambient air flow of 50 milliliters per minute.

2. The positive electrode active material for a secondary battery of claim 1, wherein the at least one doping element is included in an amount of 1,000 ppm to 10,000 ppm.

3. The positive electrode active material for a secondary battery of claim 1, wherein the lithium composite transition metal oxide is represented by Formula 2:

$Li_pNi_{1-(x2+y2+z2)}Co_{x2}M^a_{y2}M^b_{z2}M^c_{q2}O_2$ [Formula 2]

wherein, $M^a$ is at least one element selected from the group consisting of Mn and Al, $M^b$ is at least one element selected from the group consisting of Zr, Mg, Ti, and Ba, $M^c$ is at least one element selected from the group consisting of, Zr, Ti, Mg, Ta, Nb, Mo, W, and Cr, and $0.9 \leq p \leq 1.5$, $0 < x2 \leq 0.4$, $0 < y2 \leq 0.4$, $0 \leq z2 \leq 0.1$, $0 \leq q2 \leq 0.1$, and $0 < x2+y2+z2 \leq 0.4$.

4. The positive electrode active material for a secondary battery of claim 1, wherein an amount of residual lithium by-products present in the lithium composite transition metal oxide is 0.6 wt % or less.

5. The positive electrode active material for a secondary battery of claim 1, wherein cation disorder of Ni cations of a lithium layer in a lithium composite transition metal oxide structure is 0.5% or less.

6. The positive electrode material for a secondary battery of claim 1, wherein 40 mol % to 60 mol % of a total amount of the at least one doping element is contained in a core region corresponding to 50% of a radius from a center of a particle of the lithium composite transition metal oxide to a surface thereof which is located near the center.

7. A positive electrode for a secondary battery comprising the positive electrode active material of claim 1.

8. A lithium secondary battery comprising the positive electrode of claim 7.

* * * * *

UNITED STATES PATENT AND TRADEMARK OFFICE
CERTIFICATE OF CORRECTION

| | |
|---|---|
| PATENT NO. | : 11,424,436 B2 |
| APPLICATION NO. | : 16/617273 |
| DATED | : August 23, 2022 |
| INVENTOR(S) | : Park et al. |

It is certified that error appears in the above-identified patent and that said Letters Patent is hereby corrected as shown below:

On the Title Page

Item [71], after "Applicant" delete "LG Chern, Ltd.," and insert --LG Chem, Ltd.,--

Signed and Sealed this
Eighteenth Day of October, 2022

Katherine Kelly Vidal
*Director of the United States Patent and Trademark Office*